United States Patent
Richerson et al.

[11] 3,895,219
[45] July 15, 1975

[54] COMPOSITE CERAMIC HEATING ELEMENT

[75] Inventors: David W. Richerson, Tempe, Ariz.; Gerald Q. Weaver, Worcester, Mass.

[73] Assignee: Norton Company, Worcester, Mass.

[22] Filed: Nov. 23, 1973

[21] Appl. No.: 418,375

[52] U.S. Cl. ............... 219/553; 106/44; 252/301.1; 264/63; 431/66; 428/375; 428/446
[51] Int. Cl. .... B32b 5/16; B32b 3/02; C04b 35/70; C04b 35/64
[58] Field of Search ........ 106/44; 161/43, 162, 165; 117/121, 125, 201, 106; 264/63; 431/66; 252/301.1 R

[56] References Cited
UNITED STATES PATENTS

| | | | |
|---|---|---|---|
| 3,222,438 | 12/1965 | Parr et al. | 106/44 X |
| 3,305,372 | 2/1967 | Taylor | 106/44 X |
| 3,344,080 | 9/1967 | Livey et al. | 106/44 X |
| 3,468,992 | 9/1969 | Lubatti et al. | 106/44 X |
| 3,492,153 | 1/1970 | Ervin, Jr. | 106/44 X |

Primary Examiner—Philip Dier
Attorney, Agent, or Firm—Arthur A. Loiselle, Jr.

[57] ABSTRACT

An electrical heating element comprised of a mixture of from 10 to 60% by weight of silicon carbide and 40 to 90% by weight of silicon nitride, silicon oxynitride, silicon aluminum oxynitride or mixtures of these. The heating elements typically have a flexural strength of approximately 100,000 p.s.i. by virtue of the near theoretical density which is achieved by forming the elements using hot-pressing fabrication techniques. The resistivity is variable over a range of from $10^{-1}$ to $10^7$ ohm centimeters by manipulating the relative amounts of silicon carbide, and the silicon nitride, silicon oxynitride, and/or silicon aluminum oxynitride. The broad resistivity spectrum possible and the high physical strength of the present heating elements permits a very large variety of element configurations ranging from the simplest heating rod to heating surfaces which can be used as structural members in a furnace or other heat treating device.

9 Claims, 1 Drawing Figure

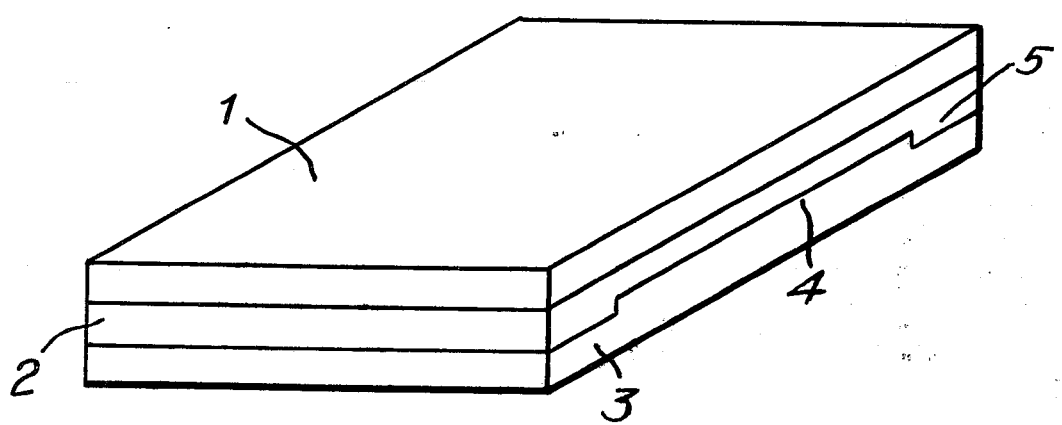

COMPOSITE CERAMIC HEATING ELEMENT

CROSS REFERENCE TO RELATED APPLICATIONS

The instant application is closely related to the subject matter of the application Ser. No. 392,094 filed on or about Aug. 27, 1973 in the name of David W. Richerson, entitled "Hot Pressed Silicon Nitride Containing Finely Dispersed Silicon Carbide," said earlier application having been assigned to Norton Company, Worcester, Massachusetts, the assignee of the present application. The subject matter of the earlier filed application is hereby, in its entirety, incorporated by reference in the instant application.

BACKGROUND OF THE INVENTION

The invention relates to electrical resistance heater elements. More particularly the invention relates to resistance heaters in the form of tubes, rods, plates, and the like, having controllable resistivity, extraordinary mechanical strength, and resistance to degradation by reactive environments.

As early as U.S. Pat. No. 599,351 to O'Neil, electricresistance heaters have been known which are based on refractory oxides viz. the oxides of vanadium, copper, chromium, iron, cobalt, nickel and tungsten, and the oxides of silicon with other metal oxides such as those of aluminum, magnesium, and zirconium. U.S. Pat. No. 2,003,592 to Hediger discloses improved silicon carbide resistance heaters where the transverse strength of silicon carbide rods is improved from 2,000 to 4,000 p.s.i. and 2,500 to 4,200 p.s.i., and the magnitude of the increase in resistivity as a function of time in use, is greatly reduced by coating the silicon carbide heating element with a glaze made up of a mixture of relatively fine silicon carbide powder and clay e.g. bentonite. U.S. Pat. No. 3,248,346 describes improved molybdenum silicide heating elements wherein the improvement is derived from the incorporation in the heating element, of silicon oxynitride. A more elaborate heating element is described in U.S. Pat. No. 3,504,327 to Clement et al. Basically the heating element consists of a graphite core upon which alternating layers of a refractory oxide and a metal have been deposited, the first coating adjacent to the graphite core being a refractory oxide coating. The refractory oxides suggested are alumina, zirconia, chromia, magnesia alumina spinel, and zirconium silicate. Suggested metals are nickel, iron, cobalt, copper, chromium, silicon, titanium, or their alloys. The concept requires that the graphite core be at least first coated with a refractory oxide, followed by a coating of metal, and finally by a second exterior coating of refractory oxide. However additional alternating refractorymetal coatings may be employed. The resulting heating elements have improved mechanical strength and increrased life due to the protective effect of the multiple layered encasement. Heating elements composed of a mixture of silicon carbide and silicon nitride are disclosed in U.S. Pat. No. 866,444 to Egly. Following the teachings of Egly a mixture of silicon carbide and silicon, with or without a temporary binder, is cold pressed to the desired shape and then subjected to heat treatment in a nitrogen atmosphere. This results in the in situ formation of silicon nitride. The end product is a dense, high strength ceramic heating element. According to Egly 70 parts of silicon carbide and 30 parts of silicon are admixed and heated in nitrogen, the resulting silicon carbide-silicon nitride heating elements having a resistance of about 20 ohms.

All of the prior art non-metallic resistors suffer from one or more detrimental characteristics. Graphite resistors, for example, are relatively weak and highly susceptible to oxidation at high temperatures. These problems are solved to a substantial degree by encasing or jacketing the graphite resistor in such a manner as that described above; this however results in a relatively expensive heating element. Silicon carbide heating elements though more oxidation resistant than graphite, are still susceptible to that type of deterioration primarily because of the relatively high degree of porosity. Further, silicon carbide resistors are weak and therefore susceptible to breakage in handling or during use. Here again jacketing the silicon carbide resistor in a relatively impervious glaze as described in U.S. Pat. No. 2,003,592 discussed above, increases the physical strength of the element substantially and effectively diminishes the deterioration by oxygen. The refractory oxide based heating elements, although far superior for oxidation resistance, are relatively weak and porous. Likewise, heating elements based on mixtures of silicon carbide and silicon nitride as described by Egly, are highly porous and therefore mechanically weak and readily permeated by corrosive gases. In addition, close control of the resistance of such heating elements must be based on dimensional variations because the actual composition with respect to relative amounts of silicon carbide and silicon nitride cannot be closely controlled.

SUMMARY OF THE INVENTION

In brief the invention is a non-metallic resistor or heating element of widely variable and accurately controllable resistivity within the range of 0.1 to $10^7$ ohm centimeters. The heating elements possess excellent mechanical strength, having a three point load modulus of rupture of not less than 25,000 p.s.i. and in most cases in excess of 100,000 p.s.i. at room temperature. This insures maximum freedom from physical damage in use and permits the heating element per se to be used as a structural member, for example, as the walls of a furnace, or as a surface heater upon which material and articles to be treated may be directly placed. The elements are practically unaffected by corrosive environments for prolonged periods of time because they are essentially impervious to gases, vapors and liquids. The foregoing advancements over the prior art heating elements, particularly the closely controllable resistivity, result directly from hot-pressing finely particulate mixtures of 10 to 60 percent by weight of silicon carbide and 40 to 90 percent by weight of silicon oxynitride, silicon nitride and/or silicon aluminum oxynitride. For optimum strength properties the original powders are preferably fine enough to result in a finished product having a grain size of 10 microns or less. The heating elements of the present invention may take the form of rods, tubes, plates, crucibles or any other configuration amenable to the hot-pressing process. In addition, the resistor may include an electrical insulating layer integrally bonded thereto on one or more surfaces of the resistor. If the insulating layer is to be bonded to the resistor, as for example by hot-pressing, then the insulating layer or jacket is composed of silicon nitride, silicon oxynitride, silicon aluminum oxynitride, or mixtures of these refractory compounds.

BRIEF DESCRIPTION OF THE DRAWING

FIG. 1 is a perspective view of a heating element having a planar configuration.

DESCRIPTION OF THE PREFERRED EMBODIMENTS

In the preferred practice of the present invention a composite ceramic heating element is made by forming a resistor composed of a mixture of from 20 to 60 percent by weight of silicon carbide and 40 to 80 percent by weight of silicon nitride, silicon oxynitride, silicon aluminum oxynitride or mixtures thereof, and including an electrical insulating layer made up of silicon nitride, silicon aluminum oxynitride, silicon oxynitride, or mixtures thereof. The most effective method of forming the composite heating element is by the hot-press process. If forming a heating element of a plate like configuration, a graphite mold of appropriate shape is partially assembled with the mold band and bottom plate in position. A precalculated layer of silicon nitride, silicon oxynitride, or silicon aluminum oxynitride is placed in the mold and spread level. A layer of a mixture of silicon nitride and silicon carbide powder is then placed on the silicon nitride layer and spread level. A second layer of silicon nitride powder is then placed and spread level on the silicon nitride-silicon carbide layer. The top plate of the mold set-up is then placed in position and the three layers are compressed under heat to sinter the particles together to form a unitary bonded structure. Such a heating element would resemble that shown in FIG. 1 where 1 and 3 are the silicon nitride or silicon aluminum oxynitride layers, and 2 is the resistor portion of the composite. The resulting composite is free of porosity, i.e., has a density approximately equal to the theoretical density of said composite, possesses extremely high mechanical strength of the order of 70,000 p.s.i. or greater, and because of freedom from porosity is impervious to gases and liquids. The thermal expansion properties of both the external layers 1 and 3 of FIG. 1 are essentially the same or so close that the coherence between the exterior layers 1 and 3 and the resistor portion 2 is maintained throughout the great number of heat up and cool down cycles to which the heating element is to be subjected.

The resistivity range of the heating elements of the present invention is from 0.1 to 150 ohm centimeters, the preferred range being however from 0.2 to 20 ohm centimeters. Table I shows the physical properties and resistivities of various compositions. It should be noted that in Table I the symbol SiAlON is used to indicate silicon aluminum oxynitride. This is not intended to be an accurate chemical formula. A detailed description of silicon aluminum oxynitride is contained in the Richerson application cited above. Furthermore it should be noted that for the case of simplicity, whenever silicon nitride is mentioned it is to be understood that silicon oxynitride, silicon aluminum oxynitride, or mixtures of these, are interchangeable with the simple silicon nitride.

TABLE 1

MECHANICAL AND ELECTRICAL PROPERTIES OF SiAlON or $Si_3N_4$-SiC COMPOSITIONS

| Composition SiAlON or $Si_3N_4$/SiC | Density g/cm³ | MOR* at 20°C - psi | MOR** at 1375°C - psi | Resistivity ohm - cm |
|---|---|---|---|---|
| 100/0 | 3.25 | 104,000 | 53,000 | >$10^{10}$ |
| 80/20 | 3.05 | 121,800*** | 58,700 | 136 |
| 77.5/22.5 | 3.31 | 97,400 | — | 35 |
| 75/25 | 3.30 | 125,100 | 46,600 | 13 |
| 72.5/27.5 | 3.34 | 103,400 | 52,000 | 8.2 |
| 70/30 | 3.18 | 105,400*** | 46,700 | 4.5 |
| 67.5/32.5 | 3.30 | 108,800 | — | 3.3 |
| 65/35 | 3.39 | 120,700 | 46,000 | 2.0 |
| 60/40 | 3.03 | 106,500*** | 46,800 | 1.9 |
| 40/60 | — | 25,000*** | — | 1.0 |

\* 4-point flexure test with outer span of 1.5 inch and inner span of ¾ inch.
\*\* 3-point flexure test with 1 inch span.
\*\*\* 3-point flexure test with ¾ inch span.

The measurements contained in Table I were made on the resistor material alone, i.e., not including the insulating layer of silicon nitride, silicon oxynitride, or silicon aluminum oxynitride. As can be seen from the Table the modulus of rupture of straight silicon nitride is in excess of 100,000 p.s.i. at room temperature therefore the addition of a layer of silicon nitride on one or more surfaces of the resistor element or layer would not detract from the overall strength of the composite. The densities of these materials ranged from 90% of theoretical with the 60% $Si_3N_4$ and 40% SiC composition, having a density of 3.03 g/cc, to 100% of theoretical with the 65% $Si_3N_4$ and 35% SiC composition having a density of 3.39 g/cc.

The ceramic heating elements of the invention may also, and preferably do, incorporate one or more of the prior art techniques for maintaining so-called "cold ends," i.e., terminal connecting ends that remain substantially cooler, during use, than does the intermediate zone (hot zone). It is well known that if the resistance of the terminal connecting ends is substantially lower than the resistance of the hot-zone, or intermediate zone, of the heating element, then said ends will remain relatively cool. For such a resistance differential between the terminal connecting ends and the intermediate zone to be of any practical utility, it should be such that the resistance of the ends is less than one tenth the resistance of the intermediate zone.

Equally well known are the several methods of accomplishing the foregoing. For example the resistance of the ends of a dimensionally uniform heating rod can be greatly decreased by reducing the resistivity of the ends by having said ends of a different composition. Cool ends can be created in a heating element of uniform composition by impregnating and or coating the ends with a metal, e.g. silicon or a mixture of silicon and carbon if the heating element is SiC. The resistance of the ends can also be reduced by increasing the cross-sectional area of said ends relative to the intermediate zone. And obviously any combination of these approaches may be employed.

EXAMPLE I

A heating element in the form of a plate similar to that shown in FIG. 1, measuring 2.75 inches in length, 2.50 inches in width and 0.50 inches in thickness was formed using silicon nitride and silicon carbide powders having the following descriptive properties:

|  | $Si_3N_4$ | SiC |
| --- | --- | --- |
| Average particle size | −100 mesh | 3–5 microns |
| Phases | 92% α $Si_3N_4$ | 6H α SiC |
|  | < 8% β $Si_3N_4$ |  |
|  | < 1% $Si_2ON_2$ |  |
| Impurities (Wt. %) |  |  |
| Mg | .01 – .1 |  |
| Ca | .02 – .1 |  |
| Fe | .2 – .4 | .1 – .3 |
| Al | .1 – .3 | .1 – .3 |

From the above two separate batches of powders were prepared, one being made up of 40% silicon carbide by weight with 60% silicon nitride by weight, the other batch was silicon nitride alone. Both batches contained 3% by weight of $MgCO_3$ added as a sintering aid. Each mixture was separately ball milled in a slurry of isopropyl alcohol for approximately 17 hours in a tungsten carbide lined ball mill using tungsten carbide grinding media, thus comminuting the powders to a particle size of less than 3 microns. A graphite mold set-up was assembled with the exception of the top plate. An 81.0 gram quantity of the silicon nitride powder was spread in the mold, followed by 21.7 grams of the silicon carbide-silicon nitride mixture which was spread level; then the center was scraped out with a flat edge scraper to provide the thin section 4 in FIG. 1. This results in the end portions 5 having twice the thickness of the center 4. This was then followed by a 77.3 gram quantity of the silicon nitride powder which was uniformly spread and leveled. The graphite mold plate was put in position and the tri-layered content of the mold cavity was hot-pressed at 2,000 p.s.i. at 1,750° C for 60 minutes.

Electrical leads were connected to the silicon nitride-silicon carbide resistor core of the plate thus producing an insulated heating element with the following resistivity properties:

1.99 ohm cm. at 60 volts + 370°C
1.74 ohm cm. at 75 volts + 480°C
1.39 ohm cm. at 85 volts + 768°C From Table I the extraordinary physical properties of the heating elements of the present invention are apparent however, in addition, and equally important, is the fact that the composite is essentially of 0 porosity. As a result the resistor layer of the composite element is practically permanently protected from environmental deterioration by virtue of the impermeability of the silicon nitride-silicon carbide insulating layer or layers. This prolongs the useful life of the heating elements, and allows the manufacturer of true surface heaters, that is, the heating element per se can be used to support that which is being heated.

Although FIG. 1 depicts a simple planar sandwich type heating element, the actual configuration of the element is limited only by the imagination of the engineer and by the inherent limitations in the hot-pressing process. Thus the heating elements may take the form of a simple plate as shown in FIG. 1, a plate with perforations or holes therein through which air may be passed or even liquids such as water, it may take the shape of simple rods, or more complex shapes such as crucibles or boats for metal melting and treating.

What is claimed is:

1. A ceramic heating element which is comprised of a sintered mixture of from 10 to 60% by weight of silicon carbide and 40 to 90% by weight of a material selected from the group consisting of silicon nitride, silicon oxynitride, silicon aluminum oxynitride, and mixtures thereof, said sintered mixture having a density at least 90% of its theoretical density, a resistivity of from 0.1 to $10^7$ ohm centimeters, and having a resistance differential between the terminal connecting ends of said heating element and the intermediate zone thereof, the resistance at said terminal connecting ends being substantially lower than that of said intermediate zone.

2. The ceramic heating element of claim 1 having a room temperature modulus of rupture of at least 25,000 p.s.i. under three point loading, and a resistance of said terminal connecting ends of less than one tenth the resistance of the intermediate zone.

3. The ceramic heating element of claim 2 wherein said sintered silicon carbide has an average grain size of 10 microns or less, and said silicon nitride, silicon oxynitride and silicon aluminum oxynitride has an average grain size of 10 microns or less.

4. A composite ceramic heating element comprising a heating layer and electrical insulating layer in contact therewith, said heating layer comprising a mixture of 10 to 60% by weight of silicon carbide and 40 to 90% by weight of a material selected from the group consisting of silicon nitride, silicon oxynitride, silicon aluminum oxynitride, and mixtures thereof, and said insulating layer comprising a material selected from the group consisting of silicon nitride, silicon oxynitride, silicon aluminum oxynitride, and mixtures thereof; said heating element having a density at least 90% of its theoretical density, and a resistivity of from 0.1 to $10^7$ ohm centimeters.

5. The heating element of claim 4 wherein said heating layer and said insulating layer are bonded to each other to form an integral, unitary structure having a modulus of rupture at room temperature of at least 25,000 p.s.i. under three point loading, the average grain size of the silicon carbide in said heating layer being 10 microns or less, and said insulating layer being essentially impervious.

6. The heating element of claim 5 wherein said heating element is essentially planar in configuration and is covered by said insulating layer on at least one surface thereof.

7. The heating element of claim 5 wherein said heating element has a cylindrical configuration.

8. A ceramic heating element comprising a sintered mixture of from 22 to 60% by weight of silicon carbide and 40 to 78% by weight of a material selected from the group consisting of silicon nitride, silicon oxynitride, silicon aluminum oxynitride, and mixtures thereof, said sintered mixture having a density at least 90%, a modulus of rupture at room temperature of at least 100,000 p.s.i. under three point loading, a resistivity of 0.2 to 20 ohm centimeters, the sintered mixture being essentially impervious to gases, vapors and liquids.

9. The ceramic heating element of claim 8 including an electrical insulating layer integrally bonded to at least one surface thereof, said insulating layer being composed of a material selected from the group consisting of silicon nitride, silicon oxynitride, silicon aluminum oxynitride, and mixtures thereof, and having a density at least 90% of the theoretical density of said material.

* * * * *